United States Patent [19]

Uno et al.

[11] Patent Number: 5,598,294
[45] Date of Patent: Jan. 28, 1997

[54] OPTICAL FIBER AMPLIFIER AND OPTICAL FIBER COMMUNICATION SYSTEM

[75] Inventors: Tomoaki Uno, Kobe; Jun Ohya, Osaka; Masahiro Mitsuda, Uji, all of Japan

[73] Assignee: Matsushita Electric Industrial Co., Ltd., Osaka, Japan

[21] Appl. No.: 515,714

[22] Filed: Aug. 16, 1995

[30] Foreign Application Priority Data

Aug. 18, 1994 [JP] Japan .................................. 6-194086

[51] Int. Cl.$^6$ ........................................................ H01S 3/00
[52] U.S. Cl. ............................ 359/341; 359/337; 359/176
[58] Field of Search .................................. 359/341, 337, 359/176, 160

[56] References Cited

U.S. PATENT DOCUMENTS

| | | | |
|---|---|---|---|
| 5,283,686 | 2/1994 | Huber | 359/337 |
| 5,303,314 | 4/1994 | Dulling, III et al. | 385/11 |
| 5,404,413 | 4/1995 | Delavaux et al. | 385/15 |
| 5,434,702 | 7/1995 | Byron | 359/341 |

OTHER PUBLICATIONS

M. Kobayashi et al., "Low Noise Configuration of a Reflective Erbium Doped Fiber Amplifier", *Proceedings of the 1993 IEICE Fall Conference*, B-883 p. 4-124 (1993).

M. Mitsuda et al., "Analog Transmission Characteristics in Bidirectional Optical Fiber Amplifier", *Proceedings of the 1994 IEICE Spring Conference*, C-398, p. 4-395 (1994).

H. Jidai, "Trial-Manufacture of Reflective EDFA – Verification of the Possibility of Improving Noise Characteristic", No. 49, pp. 23-25 (1993).

E. L. Goldstein et al., "Multiwavelength Fiber-Amplifier Cascades in Undirectional Interoffice Ring Networks", *OFC/IOOC '93*, vol. 4, pp. 44-46 (1993).

M. Wilkinson et al., "D-Fibre Filter for Erbium Gain Spectrum Flattening", *Electronics Letters*, vol. 28, No. 2, pp. 131-132 (1992).

S. F. Su et al., "Use of Acoustooptic Tunable Filters as Equalizers in WDM Lightwave Systems", *OFC '92*, vol. 5, pp. 203-204 (1992).

*Primary Examiner*—Mark Hellner
*Attorney, Agent, or Firm*—Ratner & Prestia

[57] ABSTRACT

The optical fiber amplifier of the invention includes: a rare earth element doped optical fiber, and a pump light generator for optically pumping the rare earth element doped optical fiber. The optical fiber amplifier further includes a reflector for selectively reflecting an optical signal input from an input end of the rare earth element doped optical fiber to the input end, so as to give a gain to the optical signal.

14 Claims, 9 Drawing Sheets

OPTICAL FIBER AMPLIFIER AND OPTICAL FIBER COMMUNICATION SYSTEM

BACKGROUND OF THE INVENTION

1. Field of the Invention

The present invention relates to an optical fiber amplifier and an optical fiber communication system. More specifically, the present invention relates to an optical fiber amplifier for amplifying a set of wavelength-division-multiplexed (WDM) signals with respectively different wavelengths with a flat gain, and an optical fiber communication system including a plurality of optical fiber amplifiers connected with each other.

2. Description of the Related Art

An optical fiber amplifier includes: an optical fiber doped with a rare earth element; a semiconductor laser pump source for optically pumping the rare earth element doped in the optical fiber; and an optical multiplexer for coupling the pump light (or a laser beam) emitted from the semiconductor laser pump source with the optical fiber doped with a rare earth element. When an input signal and the pump light are input to the optical fiber doped with a rare earth element such as erbium, a population inversion is generated by the pump light inside the optical fiber doped with a rare earth element, so that the optical signal is amplified by a stimulated emission.

Reflective optical fiber amplifiers utilizing the principle mentioned above are reported in Document 1 (Kobayashi, Ishihara and Goto, "Low Noise Configuration of Reflective Erbium Doped Fiber Amplifier", Proceedings of the 1993 IEICE Fall Conference, B-883, p. 4–124, 1993) and Document 2 (Asai and Takuma, "Modeling a Reflective Erbium-Doped Fiber Amplifier (EDFA); Illustration of Possibility of Improving Noise Characteristics", Optics New Era, Kogyo Tsushin, December, No. 49, pp. 23–25, 1993).

FIG. 7 shows a conventional optical fiber amplifier having such a configuration. As shown in FIG. 7, the optical fiber amplifier includes: an optical fiber 711 for inputting an optical signal; an optical fiber 714 connected with the optical fiber 711 via an optical circulator 713; and an optical fiber 712 for outputting an optical signal connected with the optical fiber 714 via the optical circulator 713. The optical fiber 714 is connected with an erbium-doped optical fiber 715 via a wavelength multiplexing coupler 717. Pump light emitted from a semiconductor laser pump source 718 is input though the wavelength multiplexing coupler 717 into one end of the erbium-doped optical fiber 715. A reflector 716 is provided at the other end of the erbium-doped optical fiber 715.

Next, referring to FIG. 7, the operation of the optical fiber amplifier will be described.

An optical signal propagated through the optical fiber 711 is turned by the optical circulator 713 to the direction as indicated by the arrow in FIG. 7, so as to be input to the optical fiber 714. The optical signal is then multiplexed by the wavelength multiplexing coupler 717 with the pump light emitted from the semiconductor laser pump source 718, so as to be directed to the erbium-doped optical fiber 715. While the optical signal is being propagated through the erbium-doped optical fiber 715, the optical signal is amplified. Then, the amplified optical signal is reflected by the reflector 716. The signal reflected by the reflector 716 is amplified again while being propagated through the erbium-doped optical fiber 715, so as to return to the optical fiber 714. Thereafter, the optical signal is turned again by the optical circulator 713 to the direction as indicated by the arrow in FIG. 7, so as to be output to the optical fiber 712.

However, if a set of optical signals with respectively different wavelengths are simultaneously input to such an optical fiber amplifier, then the gain spectra adversely become non-flat in accordance with the respective wavelengths of the signals. FIG. 8A is a graph showing the relationship between the input spectrum (the spectrum of each of the optical input signals) and each wavelength of the respective input signals, while FIG. 8B is a graph showing the relationship between the output spectrum (the spectrum of each of the optical output signals which have been amplified) and each wavelength of the respective output signals which have been amplified. In FIGS. 8A and 8B, optical signals with eight different wavelengths are input to the optical fiber amplifier.

As shown in FIGS. 8A and 8B, the plurality of signals are given non-flat gains at different levels in accordance with the respective wavelengths. Therefore, even though the input spectra are set to be equal, the output spectra of the amplified signals become different from each other in accordance with the respective wavelengths. This is because the absorption cross section and the emission cross section of the rare earth element (erbium in this example) doped into the optical fiber are varied depending upon the wavelengths, as shown in FIG. 9. Accordingly, this phenomenon is generated irrespective of the configuration of the amplifier to be used. In general, the gain $G(\lambda s)$ per unit length of an optical fiber doped with a rare earth element (erbium) with respect to the wavelength $\lambda s$ of the optical signal is expressed by the following equation using; an emission cross section $\sigma e(\lambda s)$, an absorption cross section $\sigma a(\lambda s)$, the number $No$ of the ions pumped at a lower level, and the number $Ne$ of the ions pumped at an upper level. The gains given to the optical signals do not become flat with respect to the wavelengths $\lambda s$.

$$G(\lambda s) = \sigma e(\lambda s) \cdot Ne - \sigma a(\lambda s) \cdot No$$

This phenomenon seriously affects an optical fiber communication system for propagating a set of WDM signals by using an optical fiber and an optical fiber amplifier. For example, Document 3 (E. L. Goldstein, A. F. Elrefaie, N. Jackman, and S. Zaidi, "Multiwavelength Fiber-Amplifier Cascades in Unidirectional Interoffice Ring Networks", Technical Digest of Conference on Optical Fiber Communication (OFC/IOOC '93), TuJ3, pp. 42–44, 1993) reports non-flat gain spectra with respect to the wavelengths. In this document, fourteen WDM signals are propagated through fourteen optical fiber amplifiers cascaded by optical fibers.

In order to solve such problems, a method for compensating the gain difference with respect to the wavelengths by using the wavelength loss characteristics has been suggested. For example, Document 4 (M. Wilkinson, A. Beddington, S. A. Cassidy and P. McKee, "D-Fiber Filter for Erbium Gain Spectrum Flattening", Electronics Letters, vol. 28, No. 2, pp. 131–132, 1992) suggests a method for utilizing the wavelength loss characteristics of a diffraction grating provided in an optical fiber. On the other hand, Document 5 (S. F. Su, R. Olshansky, G. Joyce, D. A. Smith and J. E. Baran, "Use of Acoustooptic Tunable Filters as Equalizers in WDM Lightwave Systems", Technical Digest of Conference on Optical Fiber Communication (OFC'92), ThC4, pp. 203–204, 1992) suggests a method for utilizing the wavelength loss caused by a supersonic wave in an optical modulator. However, according to either of the methods described in these documents, it is still impossible to completely equalize the gains.

As reported in Document 6 (Mitsuda, Ohya and Uno, "Analog Transmission Characteristics of a Bidirectional Optical Fiber Amplifier", Proceedings of the 1994 IEICE Spring Conference, C-398, 1994), when the difference in the levels of the optical signals with different wavelengths is large, a cross-talk phenomenon where the input of an optical signal with a long wavelength reduces the gain of an optical signal with a short wavelength. When such a phenomenon occurs, almost no gain is obtained in an optical signal with a short wavelength, as is disclosed in Document 5 based on the experiment results. In such a case, it is impossible to utilize the methods disclosed in Documents 4 and 5 for compensating for the gain difference with respect to the wavelengths by using the wavelength loss characteristics. In a conventional technique for propagating WDM signals, such a problem considerably affects the performance of an optical fiber amplifier.

SUMMARY OF THE INVENTION

An optical fiber amplifier according to one aspect of the invention includes: a rare earth element doped optical fiber, and a pump light generator for optically pumping the rare earth element doped optical fiber. In the optical fiber amplifier, the optical fiber amplifier further includes a reflector for selectively reflecting an optical signal input from an input end of the rare earth element doped optical fiber to the input end, so as to give a gain to the optical signal.

In one embodiment, the reflector has a dielectric multi-layered structure.

In another embodiment, the reflector includes a fiber grating portion including a grating therein.

In still another embodiment, the optical fiber amplifier further includes a pump light reflector for selectively reflecting the pump light.

An optical fiber amplifier according to another aspect of the invention includes: a rare earth element doped optical fiber, and a pump light generator for optically pumping the rare earth element doped optical fiber. In the optical fiber amplifier, a gain per unit length of the rare earth element doped optical fiber has a wavelength dependence, and the optical fiber amplifier further includes a plurality of reflectors, each of the plurality of reflectors selectively reflecting an optical signal in a predetermined wavelength band among a plurality of optical signals input from an input end of the rare earth element doped optical fiber, thereby substantially equalizing gains given to the plurality of optical signals.

In one embodiment, the optical fiber amplifier further includes: an optical circulator connected to the input end of the rare earth element doped optical fiber; an optical fiber for inputting an optical signal and providing the optical signal to the input end, the optical fiber for inputting an optical signal being connected with the optical circulator; and an optical fiber for outputting an optical signal and receiving the optical signal from the input end, the optical fiber for outputting an optical signal being connected with the optical circulator.

In another embodiment, the plurality of reflectors include at least a first reflector and a second reflector, and a distance from the input end of the rare earth element doped optical fiber to the first reflector and a distance from the input end of the rare earth element doped optical fiber to the second reflector are adjusted so as to substantially equalize a first gain given to an optical signal having a first wavelength with a second gain given to an optical signal having a second wavelength.

In still another embodiment, reflectances of the plurality of reflectors are adjusted so as to substantially equalize gains given to the plurality of optical signals.

According to still another aspect of the invention, an optical fiber communication system including a plurality of optical fiber amplifiers connected with each other is provided. Each of the plurality of optical fiber amplifiers includes: a rare earth element doped optical fiber, and a pump light generator for optically pumping the rare earth element doped optical fiber. In each of the plurality of optical fiber amplifiers, a gain per unit length of the rare earth element doped optical fiber has a wavelength dependence. Each of the plurality of optical fiber amplifiers further includes: a plurality of reflectors for selectively reflecting an optical signal in a predetermined wavelength band among a plurality of optical signals input from an input end of the rare earth element doped optical fiber, thereby substantially equalizing gains given to the plurality of optical signals.

According to still another aspect of the invention, an optical fiber communication system including a plurality of optical fiber amplifiers connected in a ring shape via optical fibers is provided. Each of the plurality of optical fiber amplifiers includes: a rare earth element doped optical fiber connected to the optical fibers at one end; a pump light generator for optically pumping the rare earth element doped optical fiber; and a reflector for selectively reflecting an optical signal in a predetermined wavelength band to the one end, the optical signal being selected from a plurality of optical signals input from the one end to the rare earth element doped optical fiber. In each of the plurality of optical fiber amplifiers, the reflector transmits an optical signal in a wavelength band specific to each of the plurality of optical fiber amplifiers, the optical signal being selected from the plurality of optical signals, and outputs the optical signal from the other end of the rare earth element doped optical fiber.

According to the present invention, in order to compensate for the gain difference in accordance with the respective wavelengths, reflectors corresponding to the respective wavelengths of the optical signals are disposed at particular positions of an optical fiber doped with a rare earth element of an optical fiber amplifier having a reflective configuration. As a result, although only one optical fiber doped with a rare earth element is used as an optical gain medium (or a medium for obtaining an optical gain), it is possible to vary the effective fiber length for obtaining a gain in accordance with the respective wavelength bands so as to equalize the gains with respect to the wavelengths of the respective optical signals.

Thus, the invention described herein makes possible the advantage of providing an optical fiber amplifier and an optical fiber communication system allowing for the compensation of the gain difference in accordance with the respective wavelengths.

This and other advantages of the present invention will become apparent to those skilled in the art upon reading and understanding the following detailed description with reference to the accompanying figures.

BRIEF DESCRIPTION OF THE DRAWINGS

FIG. 5B is a graph showing an input spectrum, while

FIG. 8A is a graph showing an input spectrum, while

DESCRIPTION OF THE PREFERRED EMBODIMENTS

Hereinafter, the present invention will be described by way of illustrative examples with reference to accompanying drawings.

EXAMPLE 1

Figure 1:
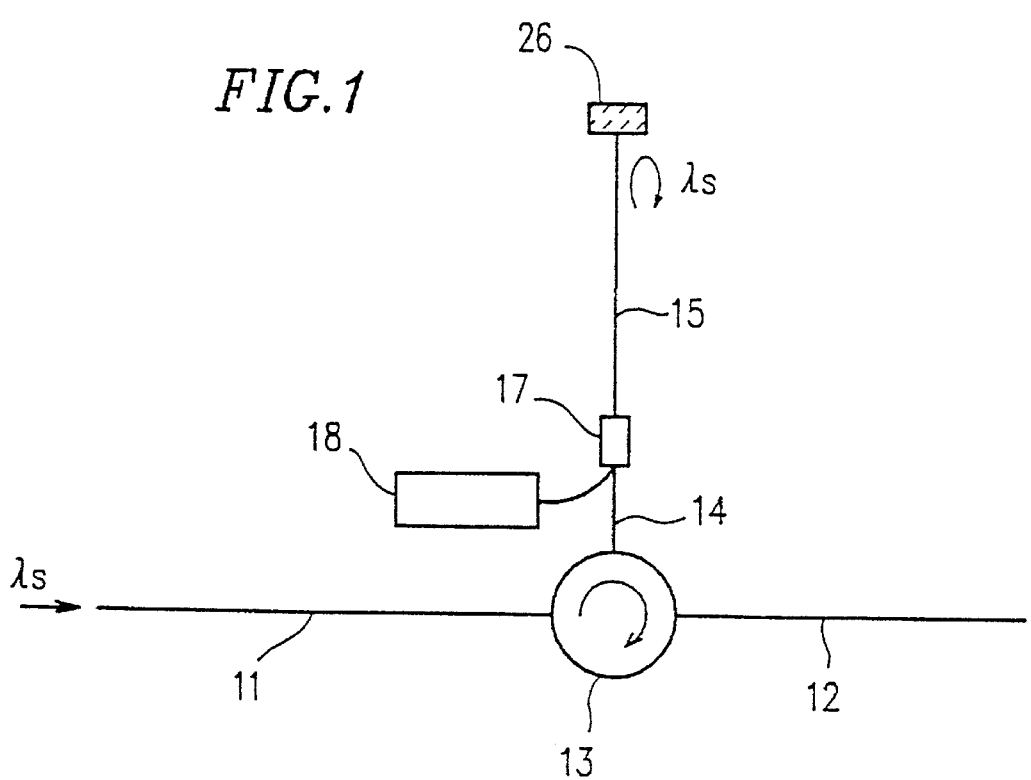
FIG. 1 shows a configuration of an optical fiber amplifier according to a first example of the present invention.

An optical fiber amplifier according to a first example of the present invention will be described with reference to the drawings. FIG. 1 schematically shows a configuration of an optical fiber amplifier according to the first example of the present invention.

As shown in FIG. 1, the optical fiber amplifier includes: an optical fiber 11 for inputting an optical signal; an optical fiber 14 connected with the optical fiber 11 via an optical circulator 13; and an optical fiber 12 for outputting an optical signal connected with the optical fiber 14 via the optical circulator 13. The optical fiber 14 is connected with an erbium-doped optical fiber 15 via a wavelength multiplexing coupler 17. Pump light emitted from a semiconductor laser pump source 18 (laser beam with a wavelength of 1.48 µm or 0.98 µm) is input though the wavelength multiplexing coupler 17 into one end of the erbium-doped optical fiber 15.

Figure 7:
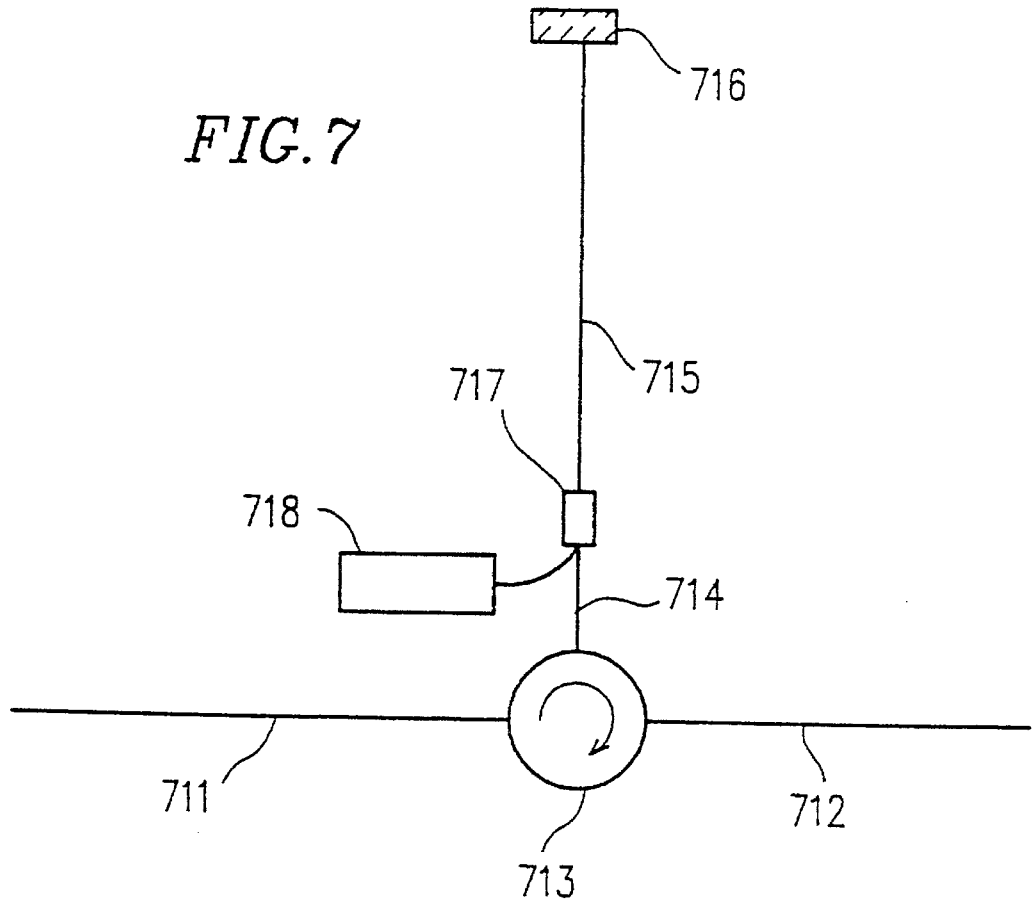
FIG. 7 shows a configuration of a reflective optical fiber amplifier according to a conventional example.

In the above description; the optical fiber amplifier shown in FIG. 1 has substantially the same configuration as that of the optical fiber amplifier shown in FIG. 7. The optical fiber amplifier of this example is characterized in that a wavelength-selective reflector 26 for selectively reflecting the light in a predetermined wavelength band is provided at the other end of the erbium-doped optical fiber 15. The light with a wavelength outside of the predetermined wavelength band is not reflected by the wavelength-selective reflector 26. In this example, the wavelength selectivity is adjusted so that the optical signal in a predetermined wavelength band is reflected by the wavelength-selective reflector 26.

Next, the operation of the optical fiber amplifier will be described.

An optical signal propagated through the optical fiber 11 is turned by the optical circulator 13 to the direction as indicated by the arrow in FIG. 1, so as to be input to the optical fiber 14. The optical signal is then multiplexed by the wavelength multiplexing coupler 17 with the pump light emitted from the semiconductor laser pump source 18, so as to be directed to the erbium-doped optical fiber 15. While the optical signal is being propagated through the erbium-doped optical fiber 15, the optical signal is amplified. Then, the amplified signal is reflected by the wavelength-selective reflector 26. The optical signal reflected by the wavelength-selective reflector 26 is amplified again while being propagated through the erbium-doped optical fiber 15, so as to return to the optical fiber 14. Thereafter, the optical signal is turned again by the optical circulator 13 to the direction as indicated by the arrow in FIG. 1, so as to be output to the optical fiber 12.

Figure 8A:
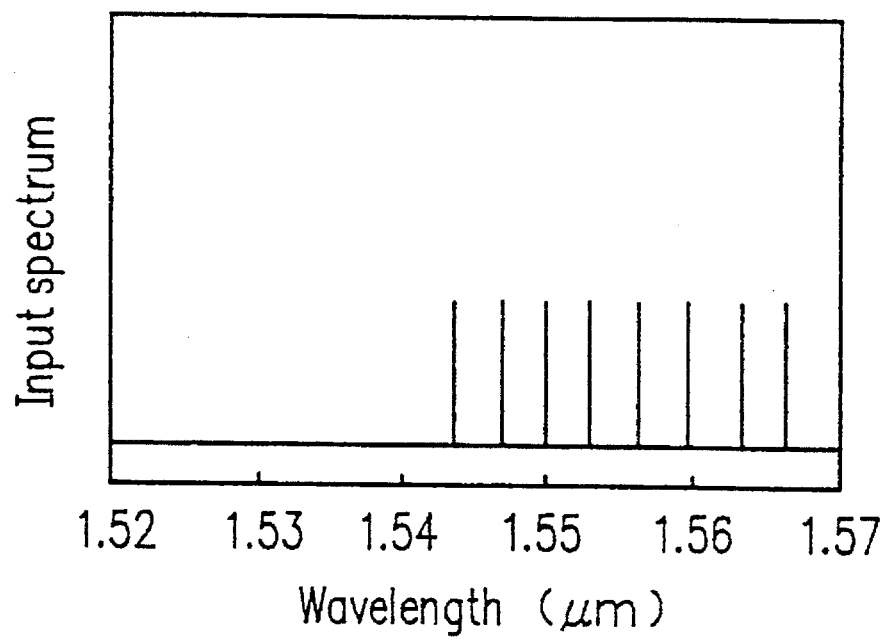
Figure 8B:
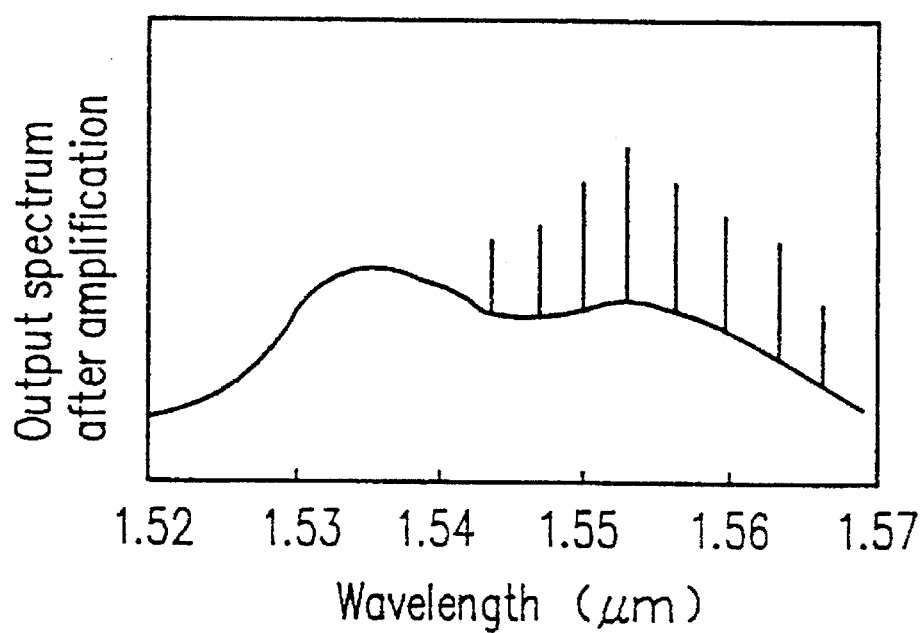
FIG. 8B is a graph showing an output spectrum after the signal has been amplified in a conventional optical fiber amplifier.
Figure 9:
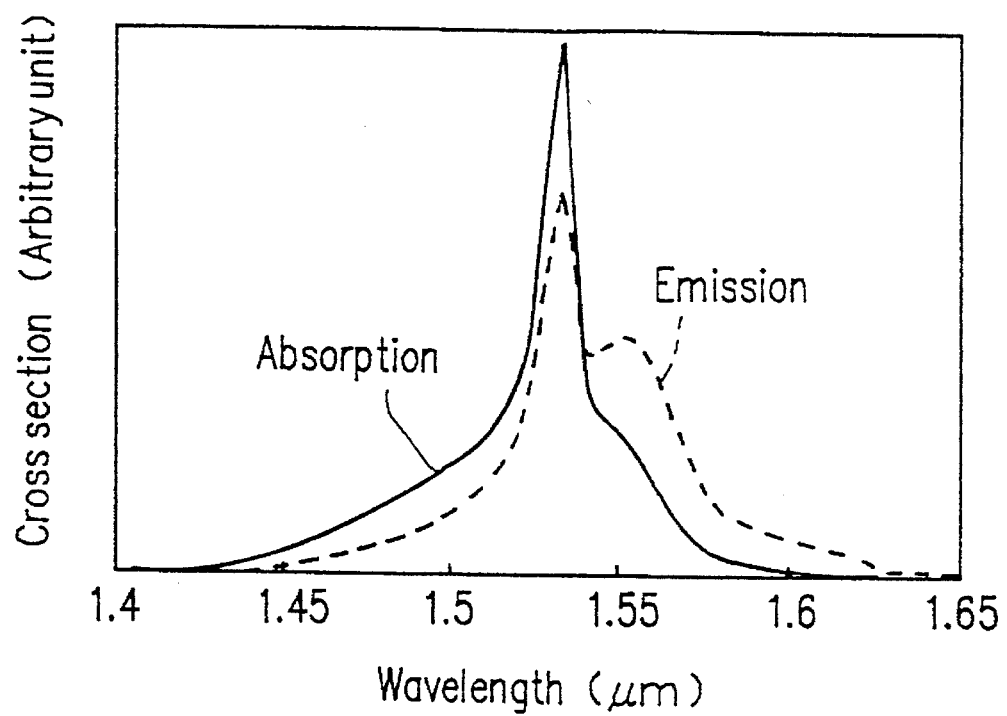
FIG. 9 is a graph showing a wavelength dependence of the absorption cross section and the emission cross section of an erbium-doped optical fiber.

In the erbium-doped optical fiber 15, spontaneous emission is generated and then amplified. The amplified spontaneous emission (ASE) generates a noise. In FIG. 8B, the smoothly varying curve indicates the output spectrum of the amplified spontaneous emission. In this example, the wavelength selectivity of the wavelength-selective reflector 26 is adjusted so that the majority of the spontaneous emission is transmitted and only the remaining spontaneous emission in a predetermined small wavelength band including the optical signal is reflected by the wavelength-selective reflector 26. As a result, the output light contains the amplified spontaneous emission in the predetermined small wavelength band to be reflected by the wavelength-selective reflector 26, in addition to the optical signal. Therefore, according to the present invention, it is possible to amplify the optical signal while eliminating the unnecessary spontaneous emission. Consequently, the ratio of the signal to the noise (or the spontaneous emission) contained in the amplified optical signal can be improved.

Figure 2A:
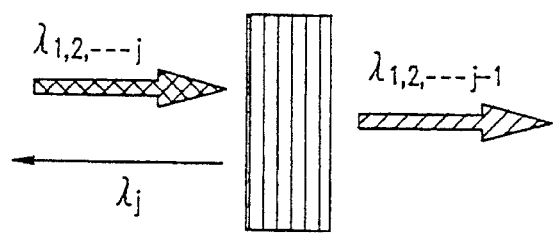
FIGS. 2A and 2B show configurations of reflectors to be used according to the present invention.

Next, referring to FIGS. 2A and 2B, a specific configuration of the wavelength-selective reflector 26 will be described. FIG. 2A shows a reflector formed by a dielectric multi-layered film. By depositing a plurality of dielectric layers with respectively different refractive indices, it is possible to realize desired low-pass, high-pass or band-pass characteristics. The reflector is connected with the optical fiber 15 via an optical system using a lens.

Figure 2B:
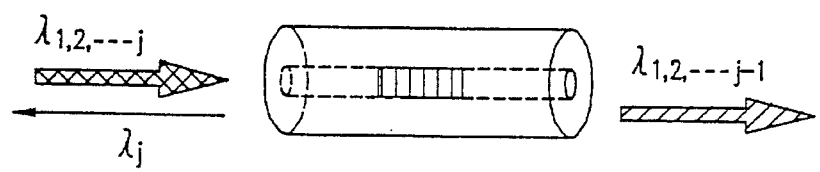

FIG. 2B shows a reflector called a "fiber grating". By externally irradiating a part of the optical fiber 15 with an ultraviolet laser beam emitted from an excimer laser or the like, a grating is directly formed on the part of the optical fiber 15. In this configuration, it is possible to form a reflector for selectively reflecting the light in a predetermined wavelength band in an arbitrary portion of the optical fiber 15 along the longitudinal direction without having to cut the optical fiber 15. The wavelength of the light reflected by the reflector is controlled by the period of the grating. The reflectance of the reflector can be adjusted by controlling the amount of the exposure light of the laser and the variation amount of the refractive index inside the optical fiber. Such a fiber grating fundamentally has a band-pass transmission characteristic, and a large reflectance only in a predetermined wavelength band. In addition, since it is not necessary to cut the optical fiber in fabricating the reflector, the low-loss and high-reflectance characteristics stabilized even at a high temperature are realized for the reflector.

By using the wavelength-selective reflectors as shown in FIGS. 2A and 2B, it is possible to obtain a reflectance of about 95% or more with respect to the light in a wavelength band in a range of 1.550 to 1.560 µm, and a reflectance of about 0.001% or less with respect to the light outside of the predetermined wavelength band.

Figure 2C:
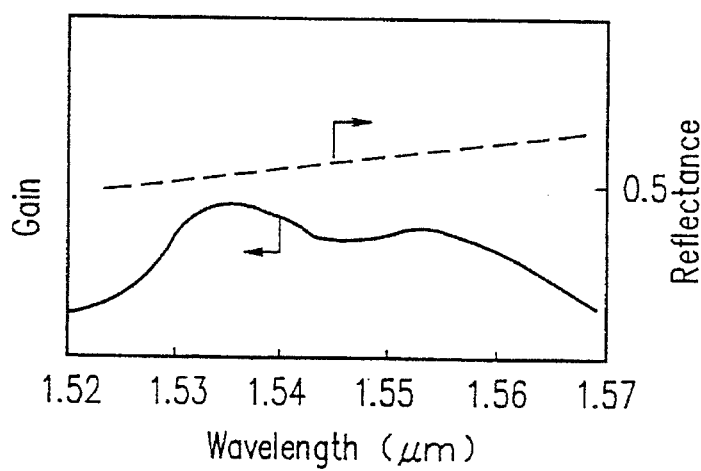
FIG. 2C is a graph showing a reflectance of a conventional reflector shown in FIG. 7.
Figure 2D:
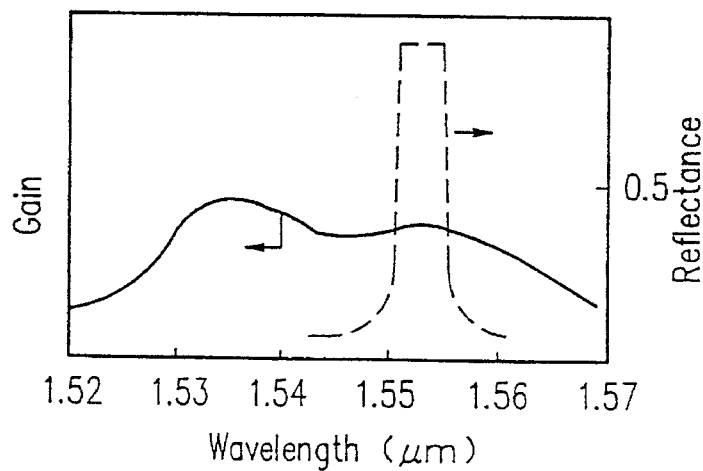
FIG. 2D is a graph showing a reflectance of a wavelength-selective reflector to be used according to the present invention.

FIG. 2C is a graph schematically showing the wavelength dependence of the reflectance of a conventional reflector 716 shown in FIG. 7. FIG. 2D is a graph schematically showing the wavelength dependence of the reflectance of a wavelength-selective reflector to be used according to the present invention.

As shown in FIG. 2D, the reflectance profile of the reflector of the present invention preferably has a width smaller than that of the gain profile thereof. By using a reflector having such a reflectance, it is possible to eliminate the majority of the amplified spontaneous emission shown in FIG. 8B from the output light.

EXAMPLE 2

Figure 3:
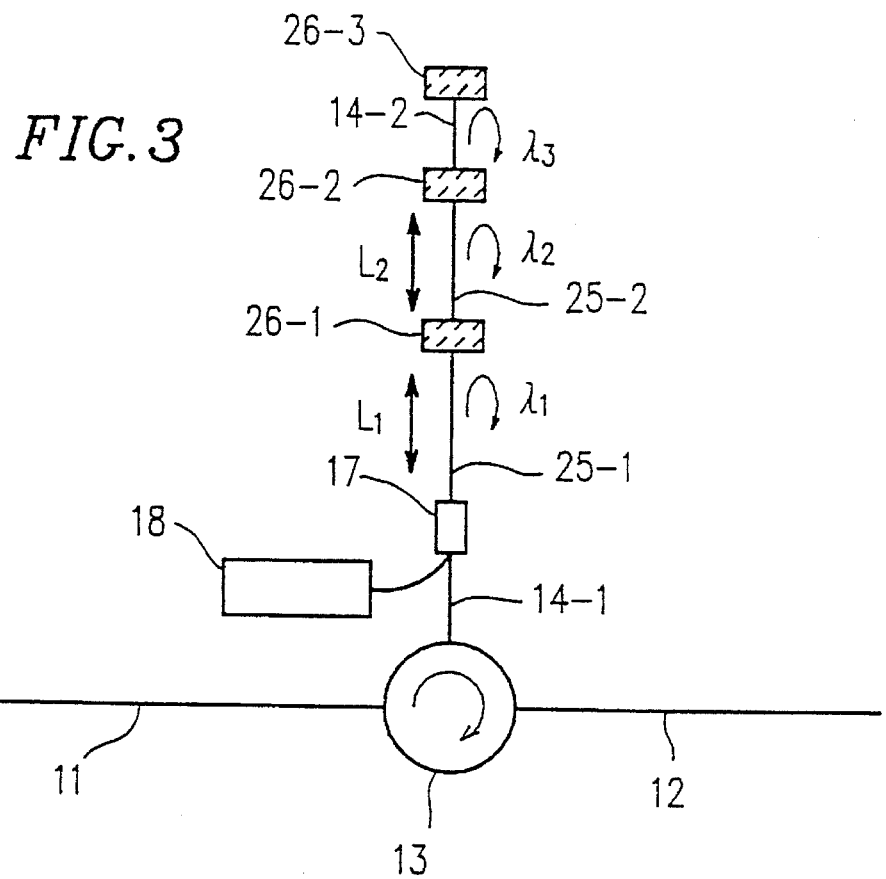
FIG. 3 shows a configuration of an optical fiber amplifier according to a second example of the present invention.

Next, an optical fiber amplifier according to a second example of the present invention will be described with reference to FIG. 3. In FIG. 3, the components corresponding to those of the optical fiber amplifier shown in FIG. 1 are denoted by the same reference numerals, and the description thereof will be omitted herein.

In this example, three optical signals with the wavelengths $\lambda 1$, $\lambda 2$ and $\lambda 3$ are input and then amplified. The optical fiber amplifier of this example includes a plurality of wavelength-selective reflectors 26-1, 26-2 and 26-3. These reflectors selectively reflect the light in the respectively different wavelength bands. More specifically, the reflector 26-1 reflects the light with a wavelength $\lambda 1$, the reflector 26-2 reflects the light with a wavelength $\lambda 2$, and the reflector 26-3 reflects the light with a wavelength $\lambda 3$. The reflector shown in FIG. 2A or 2B is used herein.

Between an optical circulator 13 and the wavelength-selective reflector 26-3, a first optical fiber 14-1, a first erbium-doped optical fiber 25-1 (of a length L1), a second erbium-doped optical fiber 25-2 (of a length L2), and a second optical fiber 14-2 are connected in this order.

When a frequency-multiplexed analog optical signal with a wavelength $\lambda 1$ of 1.56 µm, a base band digital optical signal with a wavelength $\lambda 2$ of 1.535 µm, and a base band digital optical signal with a wavelength $\lambda 3$ of 1.538 µm are used, an equal gain of 18 dB can be obtained with respect to the three optical signals with the three wavelengths under the conditions that the output pump light is 100 mW; the erbium ion concentration of the rare earth element doped optical fiber is 250 ppm; L1=50 m; L2=20 m; the level of the input analog optical signal is 0 dBm; and the level of the other input digital optical signals is −20 dBm.

In this example, the gain per unit length obtained by the rare earth element doped optical fiber becomes largest when the optical signal with the wavelength $\lambda 1$ of 1.56 µm is input. The gain becomes slightly lower when the optical signals with the wavelengths $\lambda 2$ and $\lambda 3$ of 1.535 µm and 1.538 µm, respectively, are input. The gain obtained when the optical signal with the wavelength $\lambda 2$ of 1.535 µm is input is not largely different from that obtained when the optical signal with the wavelength $\lambda 3$ of 1.538 µm is input.

In this example, the length of the rare earth element doped optical fiber for propagating the optical signal with the wavelength $\lambda 1$ is L1. On the other hand, both the lengths of the rare earth element doped optical fibers for propagating the optical signals with the wavelengths $\lambda 2$ and $\lambda 3$, respectively are set to be L1+L2. Since the optical fiber 14-2 is not doped with erbium, the optical signal with a wavelength $\lambda 3$ is not amplified by the optical fiber 14-2.

The lengths of the rare earth element doped optical fibers through which the optical signals with the wavelengths $\lambda 2$ and $\lambda 3$ are propagated are set to be equal, because the input levels of both optical signals are small, and the wavelength $\lambda 2$ is relatively close to the wavelength $\lambda 3$.

In place of the optical fiber 14-2, a rare earth element doped optical fiber can also be used. In such a case, it is possible to independently control the gains given to the three optical signals. In this example, an analog optical signal and a digital optical signal are used. However, the present invention is not limited to any optical modulation method.

In the case of amplifying a large number of optical signals, optimal wavelength bands are selected for the respective wavelength-selective reflectors, in view of the wavelengths of the optical signals to be used and the wavelength dependence of the gains.

EXAMPLE 3

Figure 4:
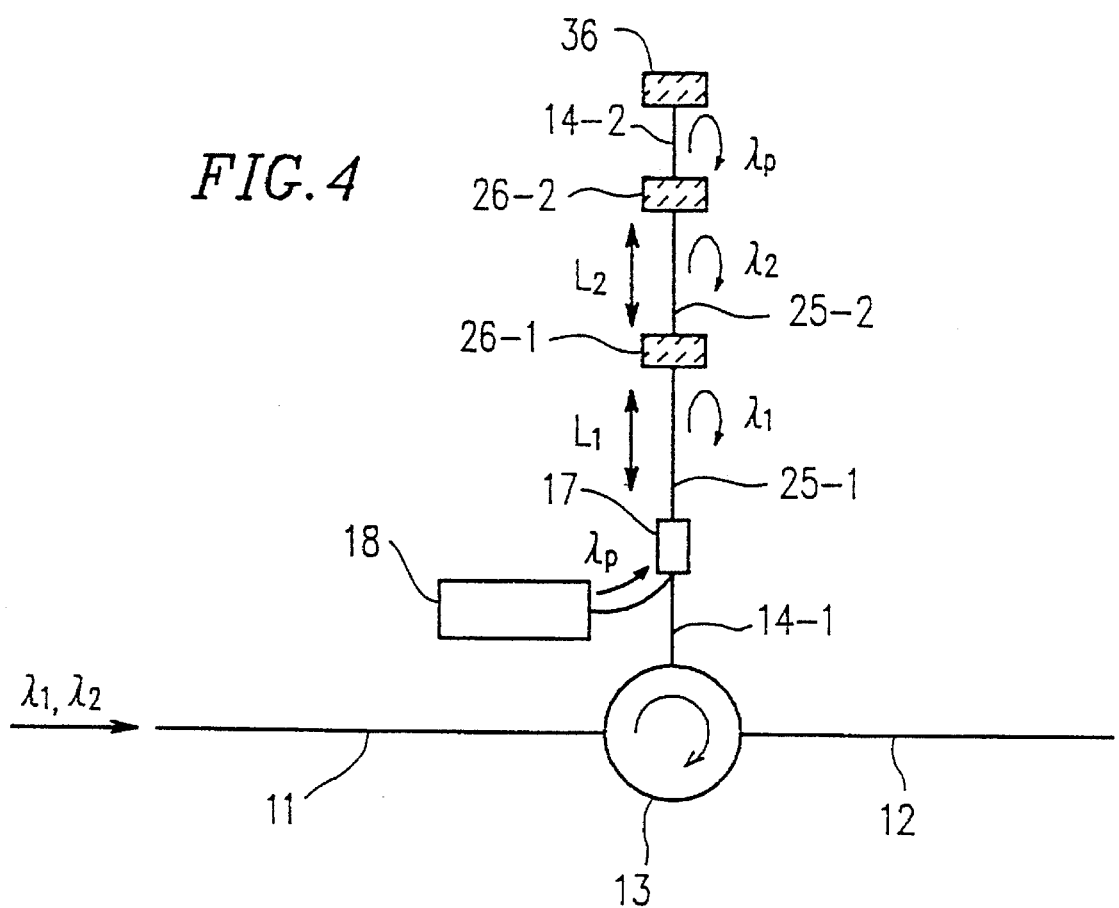
FIG. 4 shows a configuration of an optical fiber amplifier according to a third example of the present invention.

Next, an optical fiber amplifier according to a third example of the present invention will be described with reference to FIG. 4. The optical fiber amplifier shown in FIG. 4 is different from the optical fiber amplifier shown in FIG. 3 in that a pump light reflector 36 for selectively reflecting pump light (wavelength: $\lambda p$) is provided at one end of the second optical fiber 14-2.

When a frequency-multiplexed analog optical signal with a wavelength $\lambda 1$ of 1.56 µm, and a base band digital optical signal with a wavelength $\lambda 2$ of 1.535 µm are input, an equal gain of 19 dB can be obtained with respect to the two optical signals under the conditions that the output pump light is 100 mW; the erbium ion concentration of the rare earth element doped optical fiber is 250 ppm; L1=50 m; L2=20 m; the level of the input analog optical signal is 0 dBm; and the level of the input digital optical signal is −20 dBm.

In this example, the pump light which has not been absorbed by, but propagated through, the rare earth element doped optical fibers 25-1 and 25-2 is reflected by the pump light reflector 36, thereby pumping the rare earth element doped optical fibers 25-1 and 25-2 again. Accordingly, as compared with the case of not using a pump light reflector, the gain can be increased by the amplification.

In the case of using a laser beam with a wavelength $\lambda p$ of 1.48 µm as the pump light, it is preferable to use a reflector with a reflectance of about 98% or more with respect to the light in a wavelength band in a range of 1.460 to 1.485 µm, and a reflectance of about 0.1% or less with respect to the light outside of the predetermined wavelength band.

EXAMPLE 4

Next, referring to FIGS. 5A to 5C, an optical fiber communication system according to an example of the present invention will be described.

Figure 5A:
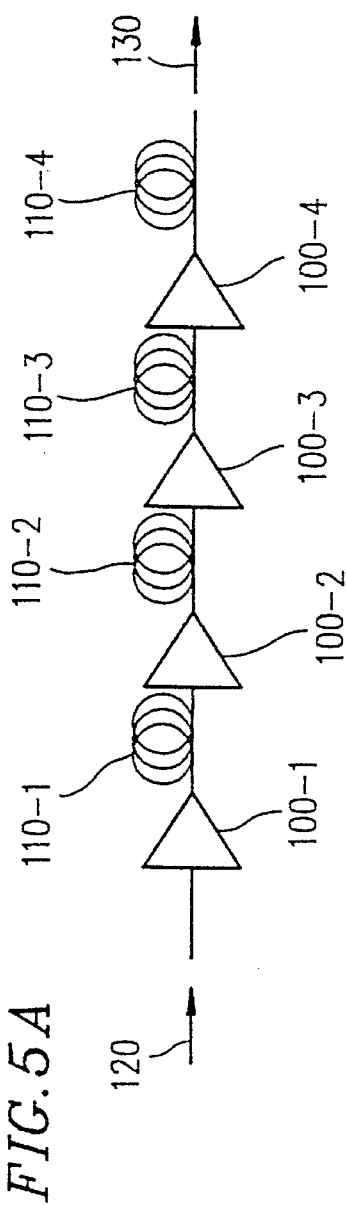
FIG. 5A shows an arrangement of an optical fiber communication system according to an example of the present invention.

As shown in FIG. 5A, in the optical fiber communication system of this example, optical fiber amplifiers 100-1, 100-2, 100-3 and 100-4 and optical fibers 110-1, 110-2, 110-3 and 110-4 are alternately connected. Each of the optical fiber amplifiers 100-1, 100-2, 100-3 and 100-4 has a similar configuration to that of the optical fiber amplifier shown in FIG. 3. These optical fiber amplifiers 100-1, 100-2, 100-3 and 100-4 are designed so that a substantially equal gain can be obtained with respect to eight optical signals with respectively different wavelengths.

Figure 5C:
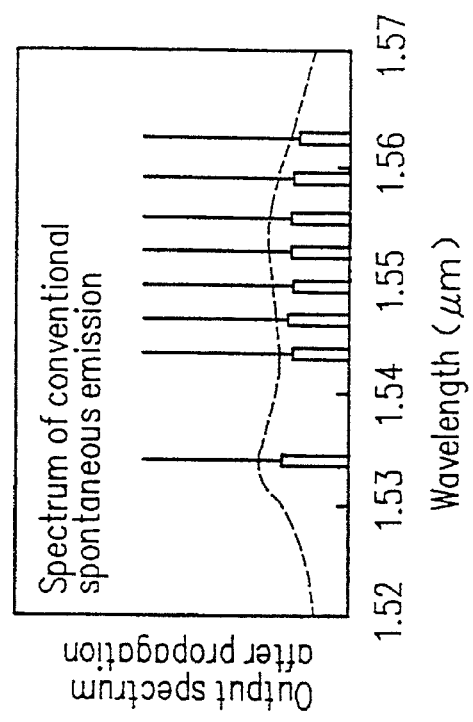
FIG. 5C is a graph showing an output spectrum after the signal has been propagated.
Figure 5B:
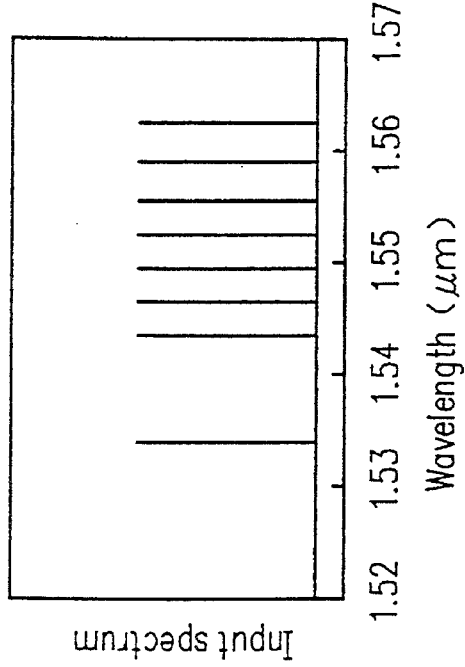

FIG. 5B shows the spectrum of the optical input signal 120, while FIG. 5C shows the spectrum of the optical output signal 130 which has been propagated. The optical fiber communication system can eliminate the variation in the signal levels in accordance with the respective wavelengths caused by the non-flat gain spectra, which has adversely been generated in a conventional optical fiber communication system. In addition, a large ASE, which has conventionally been caused by the accumulation of the ASE, is not observed in the output of the propagated signal, so that a high S/N ratio can be obtained.

EXAMPLE 5

Next, referring to FIG. 6, an optical fiber communication system according to another example of the present invention will be described.

Figure 6:
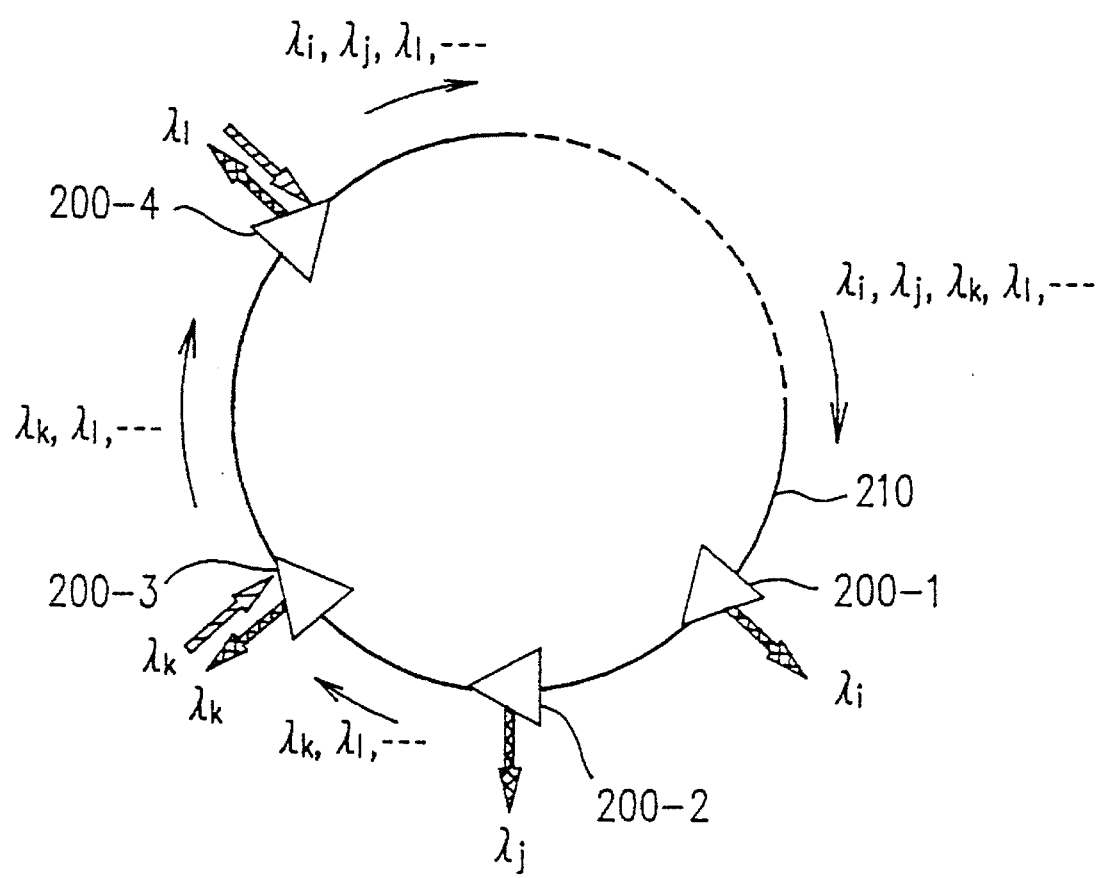
FIG. 6 shows an arrangement of an optical fiber communication system according to another example of the present invention.

In FIG. 6, optical fiber amplifiers 200-1, 2002-2, 200-3 and 200-4 have a similar configuration to that of the optical fiber amplifier shown in FIG. 3 in order to equalize the gains with respect to the optical signals with multiple wavelengths. Optical fibers 210 connected in a ring shape are provided for connecting the respective optical fiber amplifiers 200-1, 200-2, 200-3 and 200-4.

A plurality of optical signals with respectively different wavelengths λi, λj, λk, λl, etc. are being propagated through the optical fiber propagation loop. Since the optical fiber amplifier 200-1 does not include a wavelength-selective reflector for reflecting the optical signal with the wavelength λi of the plurality of the optical signals, the optical signal with the wavelength λi is output from the end different from the end where the optical fiber amplifier 200-1 is connected with the optical circulator of the rare earth element doped optical fiber. In the same way, an optical signal with the, wavelength λj is output from the optical fiber amplifier 200-2, an optical signal with the wavelength λk is output from the optical fiber amplifier 200-3, and an optical signal with the wavelength λl is output from the optical fiber amplifier 200-4. In addition, the optical signal with the wavelength λk is input from the end different from the end where the optical fiber amplifier 200-3 is connected with the optical circulator of the rare earth element doped optical fiber, and the optical signal with the wavelength λl is input from the end different from the end where the optical fiber amplifier 200-4 is connected with the optical circulator of the rare earth element doped optical fiber. In this communication system, an optical signal with the same wavelength travels through the optical fibers 210 connected in a ring shape, so that the overlapping of the signals can be prevented. In addition, the gain can be equalized with respect to the wavelengths, so that a large ASE is not observed and a high S/N ratio can be obtained. By using this communication system, it is possible to constitute a communication system in which different signals from a plurality of users within a network can be freely propagated to other users within the network by using a physically common optical fiber propagation loop, e.g., a local area network (LAN).

A wavelength of an optical signal, a level of the optical signal, and various conditions of the pump light, the rare earth element doped optical fiber and the like are determined depending upon the conditions where the optical fiber amplifier and the optical fiber communication system are used. Accordingly, these conditions are not always limited to the specific values shown in the foregoing examples.

In the foregoing examples, an optical fiber amplifier including erbium as a rare earth dopant for reflecting an optical signal with a wavelength of about 1.5 μm has been described. However, the present invention is applicable to an optical fiber amplifier including other rare earth elements such as neodymium, praseodymium or the like.

As described above, according to the present invention, it is possible to amplify an optical signal while eliminating unnecessary spontaneous emission. In addition, the amplification can be performed so that the gains can be equalized with respect to a plurality of optical signals with respectively different wavelengths. Therefore, the present invention can be effectively applied to various optical fiber communication systems for propagating wavelength-division-multiplexed (WDM) signals by using an optical fiber amplifier, such as a long-distance line, a distribution cable, or a local area network (LAN).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical fiber amplifier comprising:

a rare earth element doped optical fiber; and a pump light generator for optically pumping the rare earth element doped optical fiber;

wherein a gain per unit length of the rare earth element doped optical fiber has a wavelength dependence;

wherein the optical fiber amplifier further comprises at least two reflectors, each of the reflectors selectively reflecting an optical signal in a predetermined wavelength band among at least two optical signals input from an input end of the rare earth element doped optical fiber; and wherein a distance from the input end of the rare earth element doped optical fiber to the first reflector and a distance from the input end of the rare earth element doped optical fiber to the second reflector are adjusted so as to substantially equalize a first gain applied to an optical signal having a first wavelength with a second gain applied to an optical signal having a second wavelength.

2. An optical fiber amplifier according to claim 1, wherein the reflector has a dielectric multi-layered structure.

3. An optical fiber amplifier according to claim 1, wherein the reflector comprises a fiber grating portion including a grating therein.

4. An optical fiber amplifier according to claim 1, further comprising a pump light reflector for selectively reflecting the pump light.

5. An optical fiber amplifier according to claim 1, further comprising:

an optical circulator connected to the input end of the rare earth element doped optical fiber;

an optical fiber for inputting an optical signal and providing the optical signal to the input end, the optical fiber for inputting an optical signal being connected with the optical circulator; and an optical fiber for outputting an optical signal and receiving the optical signal from the input end, the optical fiber for outputting an optical signal being connected with the optical circulator.

6. An optical fiber communication system comprising a plurality of optical fiber amplifiers connected with each other, each of the plurality of optical fiber amplifiers comprising:

a rare earth element doped optical fiber, and a pump light generator for optically pumping the rare earth element doped optical fiber; wherein a gain per unit length of the rare earth element doped optical fiber has a wavelength dependence, each of the plurality of optical fiber amplifiers further comprising:

a plurality of reflectors for selectively reflecting an optical signal in a predetermined wavelength band among a plurality of optical signals input from an input end of the rare earth element doped optical fiber, and wherein a distance from the input end of the rare earth element doped optical fiber to a first one of the plurality of reflectors and a distance from the input end of the rare earth element doped optical fiber to a second one of the plurality of reflectors are adjusted so as to substantially equalize a first gain applied to an optical signal having a first wavelength with a second gain applied to an optical signal having a second wavelength.

7. An optical fiber communication system comprising a plurality of optical fiber amplifiers connected in a ring shape via optical fibers, each of the plurality of optical fiber amplifiers comprising:

a rare earth element doped optical fiber connected to the optical fibers at one end; a pump light generator for optically pumping the rare earth element doped optical fiber; and a reflector means for selectively reflecting an optical signal in a predetermined wavelength band to the one end, the optical signal being selected from a plurality of optical signals input from the one end to the rare earth element doped optical fiber, wherein the reflector means transmits an optical signal in a wavelength band specific to each of the plurality of optical fiber amplifiers, the optical signal being selected from the plurality of optical signals, and outputs the optical signal from the other end of the rare earth element doped optical fiber, and a distance from the one end of the rare earth element doped optical fiber to the reflector means is adjusted so as to substantially equalize a first gain applied to an optical signal having a first wavelength with a second gain applied to an optical signal having a second wavelength.

8. An optical fiber amplifier comprising:

a rare earth element doped optical fiber; and a pump light generator for optically pumping the rare earth element doped optical fiber;

wherein a gain per unit length of the rare earth element doped optical fiber has a wavelength dependence;

wherein the optical fiber amplifier further comprises at least two reflectors, each of the reflectors selectively reflecting an optical signal in a predetermined wavelength band among at least two optical signals input from an input end of the rare earth element doped optical fiber; and wherein a reflectance of the first reflector and a reflectance of the second reflector are adjusted so as to substantially equalize a first gain applied to an optical signal having a first wavelength with a second gain applied to an optical signal having a second wavelength.

9. An optical fiber amplifier according to claim 8, wherein the reflector has a dielectric multi-layered structure.

10. An optical fiber amplifier according to claim 8, wherein the reflector comprises a fiber grating portion including a grating therein.

11. An optical fiber amplifier according to claim 8, further comprising a pump light reflector for selectively reflecting the pump light.

12. An optical fiber amplifier according to claim 8, further comprising:

an optical circulator connected to the input end of the rare earth element doped optical fiber;

an optical fiber for inputting an optical signal and providing the optical signal to the input end, the optical fiber for inputting an optical signal being connected with the optical circulator; and an optical fiber for outputting an optical signal and receiving the optical signal from the input end, the optical fiber for outputting an optical signal being connected with the optical circulator.

13. An optical fiber communication system comprising a plurality of optical fiber amplifiers connected with each other, each of the plurality of optical fiber amplifiers comprising:

a rare earth element doped optical fiber, and a pump light generator for optically pumping the rare earth element doped optical fiber; wherein a gain per unit length of the rare earth element doped optical fiber has a wavelength dependence, each of the plurality of optical fiber amplifiers further comprising:

a plurality of reflectors for selectively reflecting an optical signal in a predetermined wavelength band among a plurality of optical signals input from an input end of the rare earth element doped optical fiber, and wherein a reflectance of a first reflector and a reflectance of a second reflector are adjusted so as to substantially equalize a first gain applied to an optical signal having a first wavelength with a second gain applied to an optical signal having a second wavelength.

14. An optical fiber communication system comprising a plurality of optical fiber amplifiers connected in a ring shape via optical fibers, each of the plurality of optical fiber amplifiers comprising:

a rare earth element doped optical fiber connected to the optical fibers at one end; a pump light generator for optically pumping the rare earth element doped optical fiber; and a reflector means for selectively reflecting an optical signal in a predetermined wavelength band to the one end, the optical signal being selected from a plurality of optical signals input from the one end to the rare earth element doped optical fiber, wherein the reflector means transmits an optical signal in a wavelength band specific to each of the plurality of optical fiber amplifiers, the optical signal being selected from the plurality of optical signals, and outputs the optical signal from the other end of the rare earth element doped optical fiber, and a reflectance of the reflecting means is adjusted so as to substantially equalize a first gain applied to an optical signal having a first wavelength with a second gain applied to an optical signal having a second wavelength.

* * * * *